US007164773B2

(12) United States Patent
Fabry

(10) Patent No.: US 7,164,773 B2
(45) Date of Patent: Jan. 16, 2007

(54) VEHICLE ELECTROACOUSTICAL TRANSDUCING

(75) Inventor: Michael Fabry, Southborough, MA (US)

(73) Assignee: Bose Corporation, Framingham, MA (US)

( * ) Notice: Subject to any disclaimer, the term of this patent is extended or adjusted under 35 U.S.C. 154(b) by 618 days.

(21) Appl. No.: 09/757,338

(22) Filed: Jan. 9, 2001

(65) Prior Publication Data

US 2002/0090093 A1 Jul. 11, 2002

(51) Int. Cl.
*H04B 1/00* (2006.01)

(52) U.S. Cl. .......................................... 381/86; 381/20

(58) Field of Classification Search .................. 381/86, 381/18, 302, 81, 307, 119, 20, 389; 700/94
See application file for complete search history.

(56) References Cited

U.S. PATENT DOCUMENTS 4,594,729 A * 6/1986 Weingartner ................ 381/302
4,759,066 A * 7/1988 Polk ........................... 381/302
4,819,269 A * 4/1989 Klayman .................... 381/302
5,113,447 A * 5/1992 Hatley et al. ................. 381/27
5,737,427 A 4/1998 Ambourn
5,870,484 A * 2/1999 Greenberger ............... 381/300
6,038,324 A * 3/2000 Ambourn .................... 381/307
6,430,353 B1 * 8/2002 Honda ......................... 381/81

FOREIGN PATENT DOCUMENTS

EP 1 056 310 A2 11/2000
JP 5-70100 9/1993
JP 6-225398 8/1994
JP 11-88999 3/1999

* cited by examiner

*Primary Examiner*—Sinh Tran
*Assistant Examiner*—Walter F Briney, III
(74) *Attorney, Agent, or Firm*—Fish & Richardson P.C.

(57) ABSTRACT

An audio system for a vehicle that includes a first passenger location and a second passenger location, the second passenger location situated behind the first passenger location, the audio system including a first directional audio channel signal source; a surround audio channel signal source; a first electroacoustical transducer coupled to the first directional audio signal source and to the surround audio channel source, situated forward of the second passenger location and behind the first passenger location. The first electroacoustical transducer radiates sound waves corresponding to audio signals from the first directional audio channel signal source and corresponding to audio signals from the surround audio channel signal source. The system further includes a second electroacoustical transducer coupled to the first directional audio signal source, situated forward of the first electroacoustical transducer. The second electroacoustical transducer is constructed and arranged for radiating sound waves corresponding to the first directional audio channel signal.

9 Claims, 1 Drawing Sheet

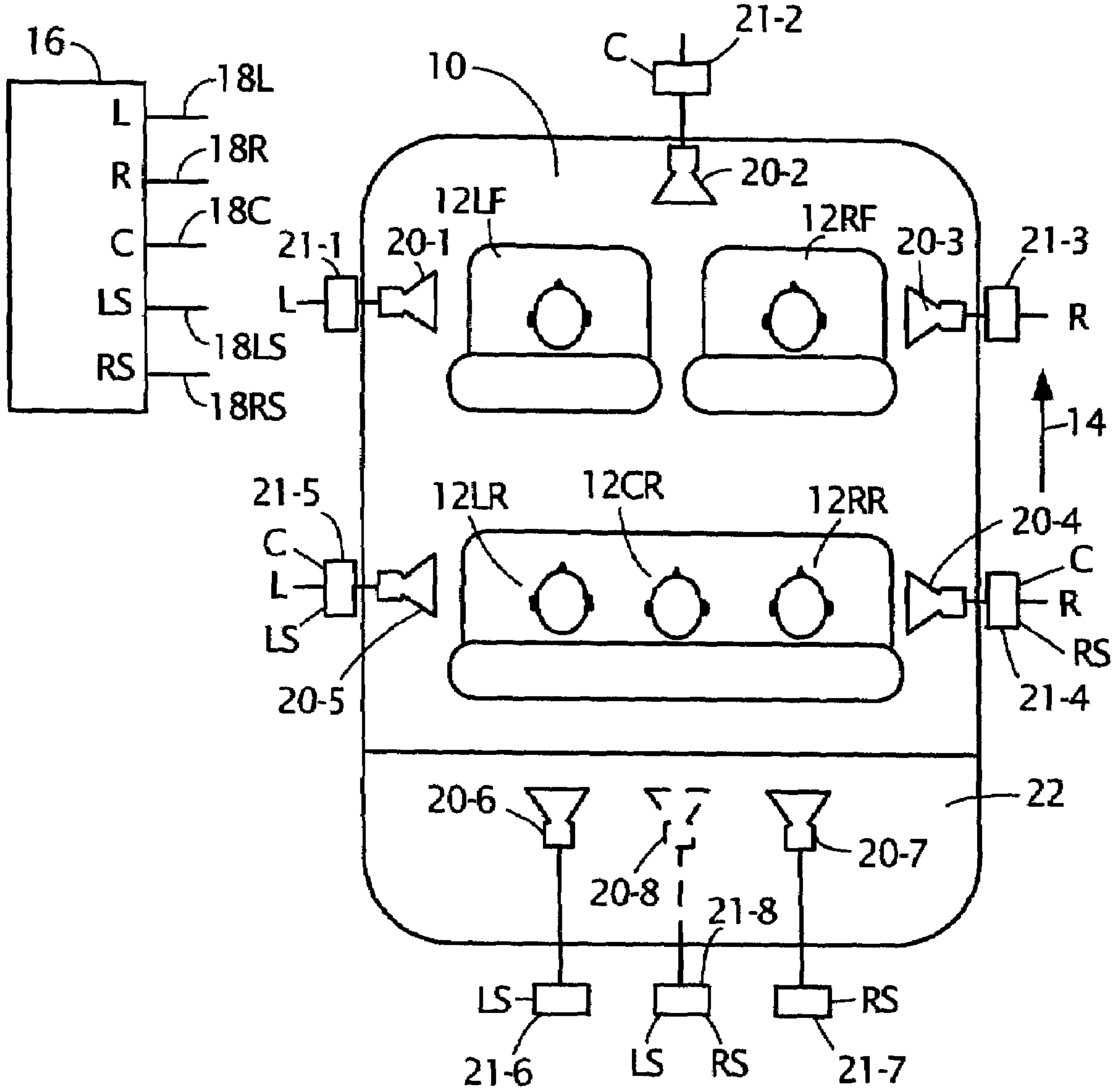
16
L
R
C
LS
RS
18L
18R
18C
18LS
18RS
10
C
21-2
20-2
12LF
12RF
21-1
20-1
20-3
21-3
L
R
14
21-5
12LR
12CR
12RR
20-4
C
L
LS
C
R
RS
20-5
21-4
20-6
22
20-7
20-8
21-8
LS
21-6
LS
RS
RS
21-7

VEHICLE ELECTROACOUSTICAL TRANSDUCING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to audio systems for vehicles, and more particularly to audio systems having surround channels and vehicles having passenger seating locations positioned one forward of another.

It is an important object of the invention to provide an improved vehicle audio system.

BRIEF SUMMARY OF THE INVENTION

According to the invention, an audio system for a vehicle having a first passenger location and a second passenger location, the second passenger location situated behind the first passenger location, includes a first directional audio channel signal source; a surround audio channel signal source; and a first electroacoustical transducer coupled to the first directional audio signal source and to the surround audio channel source, situated forward of the second passenger location and behind the first passenger location. The first electroacoustical transducer is for radiating sound waves corresponding to audio signals from the first directional audio channel signal source and corresponding to audio signals from the surround audio channel signal source. The audio system also includes a second electroacoustical transducer coupled to the first directional audio signal source, situated forward of the first electroacoustical transducer. The second electroacoustical transducer is for radiating sound waves corresponding to audio signals from the first directional audio channel signal source.

In another aspect of the invention, in a vehicle comprising a first passenger location and a second passenger location, the first passenger location situated forward of the second passenger location, a method for operating an audio system having a plurality of directional audio channel signals and a surround audio channel signal, includes transmitting a first of the plurality of directional audio channel signals and a surround audio channel signal to a first electroacoustical transducer situated forward of the second passenger location and behind the first passenger location; and transmitting the first directional audio channel signal to a second electroacoustical transducer situated forward of the first passenger location.

Other features, objects, and advantages will become apparent from the following detailed description, which refers to the drawing which is a diagrammatic view of a vehicle cabin for explaining an audio system according to the invention.

DETAILED DESCRIPTION OF INVENTION

With reference now to the to drawing there is shown a top elevational diagrammatic view of a vehicle cabin, such as an automobile passenger compartment, having an audio system according to the invention. Vehicle passenger compartment 10 has a plurality of passenger locations 12 facing in a direction 14 so that some passenger locations are situated forward of other passenger locations and, conversely, some passenger locations are situated behind other passenger locations. In the embodiment of the accompanying drawing, passenger locations 12LF (left front) and 12RF (right front) are situated forward of passenger locations 12LR (left rear), 12CR (center rear), and 12RR (right rear). Passenger locations 12LR, 12CR, and 12RR are situated behind passenger locations 12LF and 12RF. Vehicle passenger compartment 10 further contains an audio system, which includes a multi-channel signal source 16 which includes output terminals 18L, 18R, 18C, 18LS, and 18RS for outputting audio channels signals. The audio channel signals include directional channels L (left), R (right), and C (center), and surround channels LS (left surround) and RS (right surround). The suffix of the output terminals 18 designates the audio channel which each of the terminals outputs. Situated about passenger compartment 10 are electroacoustical transducers 20-1 through 20-8, which are electronically coupled to one or more of the output terminals 18 by processing and coupling circuits 21-1 through 21-8, respectively, which process and transmit audio signals to the electroacoustical transducers. Electroacoustical transducers 20-1 through 20-8 transduce the audio signals transmitted to them to sound waves (i.e. acoustical energy). For clarity, the signal lines coupling the output terminals 18 to the processing and coupling circuits are not shown. Instead, the output terminal or terminals coupled to each processing and coupling circuit are designated by the identifiers corresponding to the signal lines coupled to the transducers.

First transducer 20-1 is positioned to the left of and typically forward of passenger location 12LF, such as in the front left car door and is coupled by processing and coupling circuit 21-1 to output terminal 18L, which outputs the left audio channel. Second transducer 20-2 is positioned in the front center of the passenger compartment, such as in the center of the dashboard, and is coupled by processing and coupling circuit 21-2 to output terminal 18C, which outputs the center audio channel. Third transducer 20-3 is positioned to the right of and typically forward of passenger location 12RF, such as in the right front car door, and is coupled by processing and coupling circuit 21-3 to output terminal 18R, which outputs the right channel audio signal. Fourth transducer 20-4 is positioned to the right of and typically forward of location 12RR and to the right of and behind right front passenger location 12RF, such as in the rear right car door, and is coupled by processing and coupling circuit 21-4 to output terminals 18C, 18R, and 18RS, which output the center audio channel, the right audio channel, and the right surround audio channel, respectively. Fifth transducer 20-5 is positioned to the left of and typically forward of passenger location 12LR and to the left of and behind left front passenger location 12LF, such as in the rear left car door, and is coupled by processing and coupling circuit 21-5 to output terminals 18C, 18L, and 18LS, which output the center audio channel, the left audio channel, and the left surround audio channel, respectively. Sixth transducer 20-6 is situated behind passenger locations 12LR, 12CR, and 12RR, such as on the left side of the rear parcel shelf 22, and is coupled by processing and coupling circuit 21-6 to output terminal 18LS, which outputs the left surround channel. Seventh transducer 20-7 is situated behind passenger locations 12LR, 12CR, and 12RR, such as on the right side of the rear parcel shelf 22, and is coupled by processing and coupling circuit 21-7 to output terminal 18RS, which outputs the right surround channel. In place of, or in addition to, sixth and seventh transducers 20-6 and 20-7, may be optional eighth transducer 20-8, situated behind passenger locations 12LR, 12CR, and 12RR, such as in the center of the rear parcel shelf 22, and is coupled by processing and coupling circuit 21-8 to output terminals 18LS and 18RS, which output the left surround and right surround audio channels, respectively. If the audio system has a center surround channel (not indicated in this figure), eighth transducer may be coupled by a processing and coupling circuit to the center surround channel output terminal.

In other embodiments of the invention, the bass frequencies of some or all of the directional channels (L, R, C) are combined and radiated from a woofer transducer (not shown), and the other spectral portions of the directional channels are radiated as discussed in the paragraph above.

The effect of the embodiment shown in the drawing is that the occupants of passenger locations 12LF and 12RF hear sound waves corresponding to left audio channel L principally from first transducer 20-1. (Hereinafter, sound waves corresponding to left audio channel L will be referred to as “left channel sound,” sound waves corresponding to right audio channel R will be referred to as “right channel sound,” sound waves corresponding to center audio channel C will be referred to as “center channel sound,” and so on). Occupants of passenger locations 12LF and 12RF hear center channel sound principally from second transducer 20-2, hear right channel sound principally from third transducer 20-3, hear right surround channel sound principally from fourth transducer 20-4, and hear left surround channel sound principally from fifth transducer 20-5. Occupants of passenger locations 12LR, 12CR, and 12RR hear left channel sound principally from fifth transducer 20-5, hear center channel sound principally from the combination of fourth transducer 20-4 and fifth transducer 20-5, hear right channel sound principally from fourth transducer 20-4, hear left surround principally from sixth transducer 20-6 and hear right surround principally from seventh transducer 20-7.

Processing and coupling circuits 21-1 through 21-8 may contain a combination of analog signal processing devices, digital signal processing devices, digital to analog converters, analog—to-digital converters, and amplifiers. If processing and coupling circuits 21-1 through 21-8 couple more than one output terminal 18 with an electroacoustical transducer, the processing and coupling circuit combines the signals, and may adjust the amplitude of the signal to an appropriate level. Processing and coupling circuits 21-1 through 21-8 may be physically positioned at any point between multichannel signal source 16 and the electroacoustical transducers. Processing and coupling circuits may share a common location and may be implemented on a single circuit board or in the same device.

To account for the varying distances between the transducers and the listening locations, the audio signals to some of the transducers may be scaled by the processing and coupling circuit. In one embodiment, the audio signals to processing and coupling circuits 21-4 and 21-5 are scaled as xR+yC+zRS and xL+yC+zLS, respectively, where x=1.0, y=0.4, and z=2.0. Other values for x, y, and z may be selected based on the acoustic characteristics and the geometry of the vehicle cabin.

An audio system according to the invention is advantageous because it provides full surround to all occupants of a passenger compartment with relatively few transducers at acceptable sound levels for all passengers.

What is claimed is:

1. An audio system for a vehicle, said vehicle comprising a first passenger location and a second passenger location, said second passenger location situated behind said first passenger location, said audio system comprising:

a left or right directional audio channel signal source;

a center audio channel signal source;

a left or right surround audio channel signal source;

a first electroacoustical transducer coupled to said left or right directional audio signal source, said center channel signal source, and to said left or right surround audio channel source, the first electroacoustical transducer situated adjacent to a first side of the vehicle behind said first passenger location, said first electroacoustical transducer constructed and arranged to radiate sound waves corresponding to audio signals from only (i) said left or right directional audio channel signal source, (ii) said center channel signal source, and (iii) said left or right surround audio channel signal source; and a second electroacoustical transducer coupled to only said left or right directional audio signal source, situated adjacent to the first side of the vehicle and forward of said first electroacoustical transducer, said second electroacoustical transducer constructed and arranged to radiate sound waves corresponding to audio signals from only said first left or right directional audio channel signal source.

2. An audio system in accordance with claim 1, further comprising a first audio signal scaling device coupling said left or right directional audio channel source and said first electroacoustical transducer, a second audio signal scaling device coupling said left or right surround audio channel source and said first electroacoustical transducer; and a third audio signal scaling device coupling said center audio channel source to said first electroacoustical transducer.

3. An audio system in accordance with claim 1, further comprising a third electroacoustical transducer, situated behind said second passenger location, coupled to said left or right surround channel source, said third electroacoustical transducer constructed and arranged for radiating sound waves corresponding to audio signals from said left or right surround audio channel signal source.

4. In a vehicle comprising a first passenger location and a second passenger location, said first passenger location situated forward of said second passenger location, a method for operating an audio system having at least a center, left, right, left surround, and right surround audio channel signal, the method comprising:

transmitting a combination of only the center, left or right and left surround or right surround audio channel signals to a first electroacoustical transducer situated adjacent to a first side of said vehicle and behind said first passenger location and transmitting only said left or right audio channel signal to a second electroacoustical transducer situated adjacent to the first side of said vehicle and forward of said first electroacoustical transducer.

5. A method for operating an audio system in accordance with claim 4, further comprising scaling the amplitude of said center, left or right, and left surround or right surround audio channel signals.

6. A method for operating an audio system in accordance with claim 4, further comprising transmitting only said left surround or right surround audio channel to a third electroacoustical transducer situated behind said second passenger location.

7. An audio system for a vehicle, said vehicle comprising a first passenger location and a second passenger location, said second passenger location situated behind said first passenger location, said audio system comprising:

a center directional audio channel signal source;

a left directional audio channel signal source;

a left surround audio channel signal source;

a first electroacoustical transducer coupled to a combination of only said center directional audio channel signal source, said left directional audio channel signal source, and to said left surround audio channel source, the first electroacoustical transducer located adjacent to a first side of said vehicle and situated behind said first passenger location;

said first electroacoustical transducer constructed and arranged to radiate sound waves corresponding to audio signals from said combination of said center directional channel audio, left directional audio channel signal source, and left surround audio channel signal source;

a second electroacoustical transducer coupled to only said left directional audio signal source, situated adjacent to said first side of the vehicle and forward of said first electroacoustical transducer, said second electroacoustical transducer constructed and arranged to radiate sound waves corresponding to audio signals from only said left directional audio channel signal source; and a third electroacoustical transducer, situated in front of said first and second passenger location, coupled to said only center directional audio channel source, said third electroacoustical transducer constructed and arranged to radiate sound waves corresponding to audio signals from only said center directional audio channel signal source.

8. In a vehicle comprising a first passenger location and a second passenger location, said first passenger location situated forward of said second passenger location, a method for operating an audio system having a left, right, center, left surround and right surround audio channel signal, the method comprising:

transmitting a combination of only the (i) center, (ii) left or right, and (iii) left surround or right surround audio channel signals to a first electroacoustical transducer situated adjacent to a first side of the vehicle and behind said first passenger location;

and transmitting only the left or right audio channel signal to a second electroacoustical transducer situated adjacent to the first side of the vehicle and forward of said first electroacoustical transducer transmitting only said left or right surround audio channel to a third electroacoustical transducer situated adjacent to a second side of the vehicle and behind said second passenger location.

9. The method of claim 8 wherein the second side of the vehicle is generally perpendicular to the first side of the vehicle.

* * * * *